Nov. 4, 1969
C. W. HART
3,475,886
METHOD OF HARVESTING SUGAR CANE
Filed June 21, 1967
4 Sheets-Sheet 1
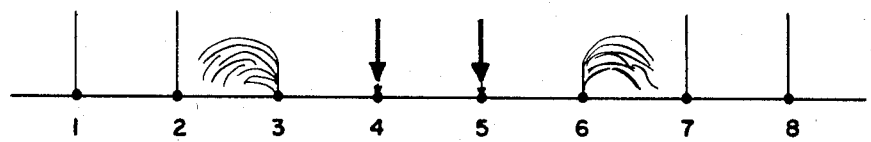
FIG.IA.
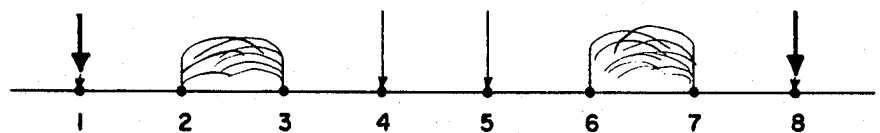
FIG.IB.
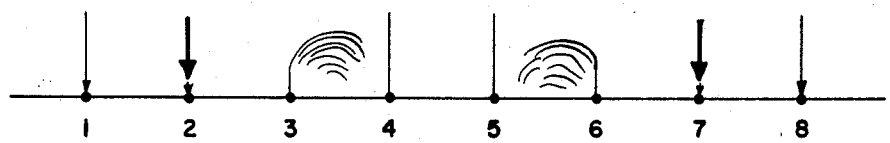
FIG.IC.
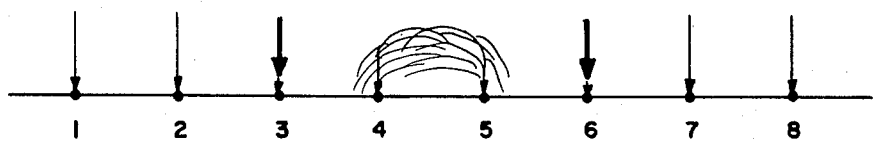
FIG.ID.
*INVENTOR*
C. W. Hart
BY Wilkinson, Mawhinney & Theibault
ATTORNEYS Nov. 4, 1969          C. W. HART          3,475,886
           METHOD OF HARVESTING SUGAR CANE
Filed June 21, 1967                    4 Sheets-Sheet 2
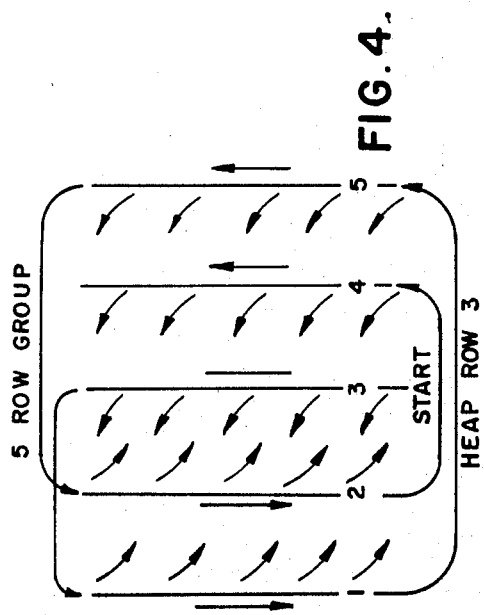
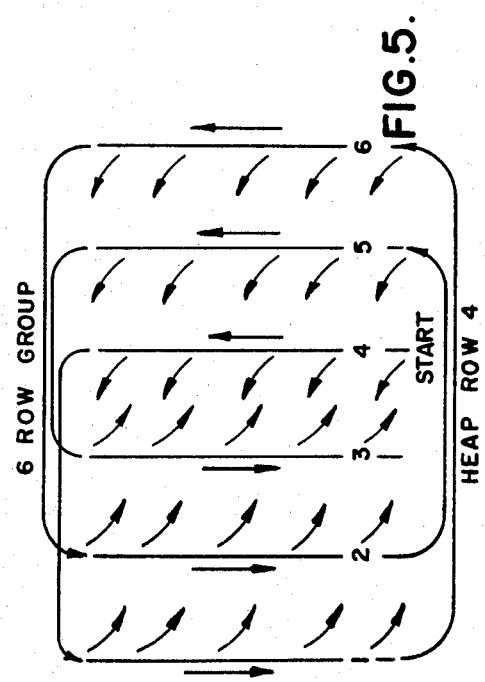
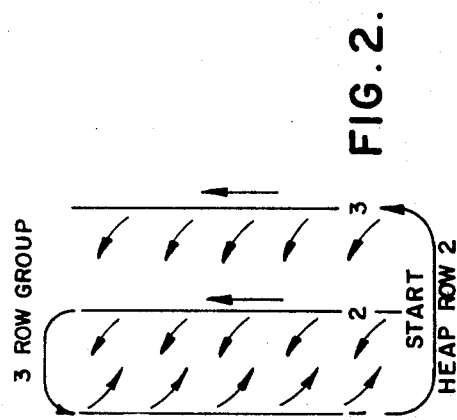
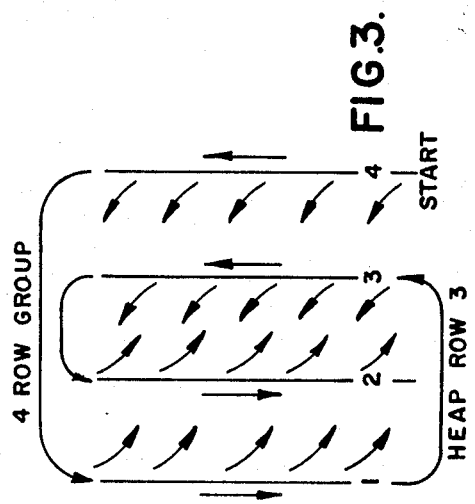
INVENTOR
C. W. Hart
BY Wilkinson, Mawhinney & Thiebault
ATTORNEYS Nov. 4, 1969  C. W. HART  3,475,886
METHOD OF HARVESTING SUGAR CANE
Filed June 21, 1967  4 Sheets-Sheet 3

INVENTOR
C.W. Hart

United States Patent Office 3,475,886
Patented Nov. 4, 1969

3,475,886
METHOD OF HARVESTING SUGAR CANE
Charles W. Hart, Hilo, Hawaii, assignor to C. Brewer and Company, Limited, a corporation of Hawaii
Filed June 21, 1967, Ser. No. 647,687
Int. Cl. A01d 91/04
U.S. Cl. 56—1                                    7 Claims

ABSTRACT OF THE DISCLOSURE

The present invention is directed to a method of cutting sugar cane and more particularly to the cutting of cane which due to variety or culture results in a condition in which (1) an erect nature of the stalk cannot be controlled, (2) the row to inter-row relationship of the field may be substantially flat as distinguished from the transverse undulation ever present in Louisiana cane fields. More specifically this harvesting method does not depend on cane being in an erect condition or on specific row hilling patterns for successful harvesting. The harvesting of sugar cane in Hawaii is a substantial departure from that method employed in Louisiana and the new method is here devised to harvest the crop in select numbers of cane row groups to sever the cane from the earth and to place all of the cane of, by way of example, cane row groups of from 3 to 8 rows on a single windrow so that a single large row may be transferred from the field to the vehicle which will transport the cane to mill. The present invention contemplates entering the center of a group of rows and cutting the cane of that row while depositing the cut cane upon standing cane of an adjacent row and thereafter going outside of the central cut and cutting from the outer limits or rows of the group toward the center while simultaneously transferring all of the cut cane from the outer rows onto a single large windrow.

The object of the present invention is to provide a new system or method of harvesting sugar cane and particularly the type of cane grown in Hawaii or Puerto Rico where the cane is grown upon substantially flat land as distinguished from the transversely undulating land in Louisiana or where the cane to be harvested is in a recumbent or non-erect condition.

A further object of the present invention resides in preselecting a group of cane rows to enter a cane field and cut in selected row groups to define a single windrow so that only a single row of a multiple group of rows of cut cane must be transferred from the earth into a vehicle for transport to the mill.

A further object of the present invention resides in the single row cutting of multiple row groups ranging from a basic minimum of 3 rows to an optimum 8 rows cut to define a single windrow.

A still further object of the present invention is provision of a method for cutting a sugar cane field in predetermined row groups in which the center of the group upon which the ultimate windrow must be heaped or piled must first be cut and then the outer limits of the row group are cut depositing the cane constantly from the outward limit of the group inwardly until all of the rows of the group have been cut and one large windrow is defined which consists of all of the cane cut from all of the rows of the group.

An object of the present invention is to practice the herein described method with a single row harvester which constantly discharges all of the cut cane to one side.

With the foregoing and other objects in view, the invention will be more fully described hereinafter, and will be more particularly pointed out in the claims appended hereto.

In the drawings, wherein like symbols refer to like or corresponding parts throughout the different views:

FIGURES 1A through 1D represent a schematic taken transversely through a sugar cane field in which the cane being cut is cut in 8 row groups and the cutting is commenced at the center of the group and thence from the outer limits inwardly progressively piling the cane inwardly to define a single windrow.

FIGURE 2 is a schematic top plan view of the method of harvesting cane in accordance with the present invention in 3 row groups.

FIGURE 3 is a schematic top plan view of the method of harvesting cane in accordance with the present invention in 4 row groups.

FIGURE 4 is a schematic top plan view of the method of harvesting cane in accordance with the present invention in 5 row groups.

FIGURE 5 is a schematic top plan view of the method of harvesting cane in accordance with the present invention in 6 row groups.

Referring more particularly to the drawings and for the moment to FIGURES 7 and 1A through 1D inclusive.

Figure 7:
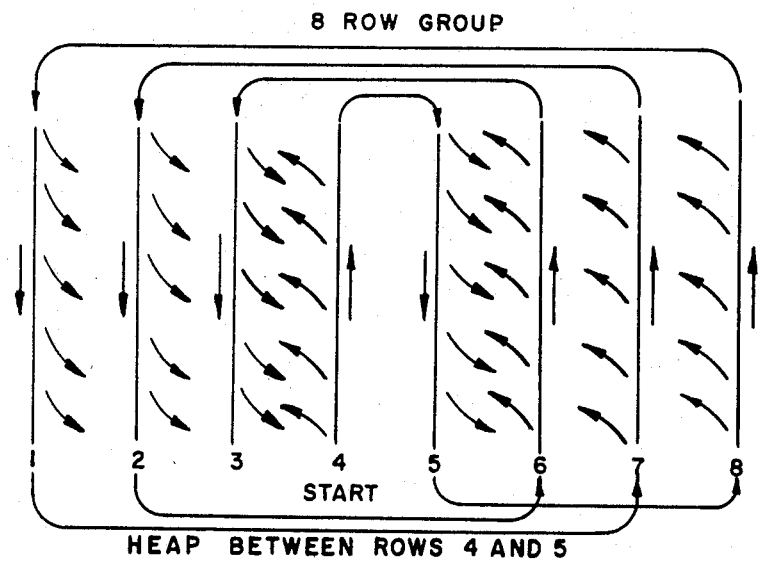
FIGURE 7 is a schematic top plan view of the method of harvesting cane in accordance with the present invention in 8 row groups.

FIGURE 7 is a top plan view of the 8 row groupings of which FIGURES 1A through 1D is a vertical transverse section. The cane in an 8 row group is harvested by moving the harvester initially down row 4 which because of the left hand discharge of the harvester the cut cane will be plied to the left upon the standing row 3. At the end of row 4 the harvester is reversed and brought back down row 5 which could be defined as the return pass of the first cut. The harvester then moves to row 8 as best seen in FIGURE 7 and FIGURE 1B proceeding down row 8 and depositing the cut cane from row 8 upon standing row 7. At the end of row 8 the harvester then traverses the entire 8 row group and comes down row 1 which is the second pass of the second cut and cuts and deposits the cane of row 1 upon standing row 2. The harvester then traverses the 7 rows and enters and commences cutting row 7 and depositing the cut cane from row 7 upon row 6. At the conclusion of the cutting of row 7 which is the first pass of the third cut the harvester then traverses and enters from the far side and commences cutting row 2 depositing the cut cane upon standing row 3 while simultaneously transferring the previously cut of row 1 plus the cut cane of row 2 onto row 3. This constitutes a completion of the second pass of the third cut after which the harvester then traverses the row groupings and enters row 6 cutting row 6 and transferring the previously cut cane from rows 8 and 7 as well as row 6 and row 5 into a single large windrow. At the end of row 6 the harvester traverses the row groupings and enters the far end of row 3 cutting the cane of row 3 while simultaneously transferring the previously cut cane from rows 1 and 2 together with row 3 and row 4 onto a single large windrow which also contains all of the cut cane of rows 5, 6, 7 and 8. Upon completion of this cycle all of the cane of the 8 row groups has been cut and piled into a single windrow, FIGURE 1D.

While initially an 8 row group has been described as a harvesting pattern to define a single windrow and a cross section of the field as well as a top plan view has been illustrated to show how the cane is progressively moved inwardly from the outer limits of the row groups inwardly to define the single large windrow, it will be appreciated that any number of row groupings from 3 through 8 or more may be practiced. The principle of this invention is not to be restricted solely to the cutting of an 8 row group but it finds utility in cutting 3 through 8 or more row groups. By way of example in view of FIG. 2 where a 3 row group is harvested the harvester will enter and initially cut row 2 depositing the cut cane to the left onto standing row 1 and upon completion of cutting row 2 the harvester will reverse direction and will come down cutting row 1 while simultaneously transferring the cane from row 2 plus the cane cut from row 1 back upon row 2 to form the windrow. Upon completion of cutting row 1 the harvester will then traverse the row grouping and cut row 3 depositing the cut cane from row 3 onto the windrow defined by the transferred cut cane from rows 1 and 2 thereby forming a single windrow of cut cane of rows 1, 2 and 3.

Referring now to FIGURE 3 wherein a 4 row group is cut, the harvester enters row 4 cutting the cane and depositing it to the left upon standing row 3 and upon completion of cutting row 4 the harvester traverses the row group and cuts row 1 depositing the cut cane to the left upon standing row 2 after which the harvester traverses the group and commerces cutting row 3 depositing the cut cane of row 3 and the previously cut cane of row 4 onto a windrow between rows 2 and 3. When row 3 has been cut the harvester then traverses and cuts row 2 and the previously cut cane from row 1 inwardly to a row grouping upon a single windrow between rows 2 and 3.

Referring now to FIGURE 4 the harvesting of a 5 row group will be described in which the harvester enters row 3 cutting the cane in this row and depositing it to the left upon the standing cane of row 2. Upon completion of harvesting row 3 the harvester will then traverse the far end of the row group and commence cutting row 1 and depositing the cane from row 1 upon still standing row 2. The harvester then traverses the row grouping to row 5 and commences cutting this row and depositing the cut cane from row 5 onto standing row 4, upon completion of which the harvester then traverses the row group and commences cutting row 2 while transferring all of the cut cane from row 2 and the previously cut cane from rows 1 and 3 inwardly of the cane group to define a single windrow. Upon completion of cutting of row 2 the harvester then enters row 4 and cuts this final standing row while simultaneously transferring to the left or inwardly of the group the previously cut cane of row 5 plus the cane being cut from row 4 and depositing same upon the single windrow of the cane group.

Referring now to FIGURE 5, a 6 row group is harvested in accordance with the present invention by entering and cutting row 4 while depositing the cane cut from row 4 upon standing row 3. Upon completion of the cut of row 4 the harvester traverses the cane row group to the outer limit and commences cutting row 1 depositing the cane cut therefrom to the left inwardly upon the standing cane of row 2. Upon completion of the cut of row 1 the harvester then traverses the entire row group and commences cutting row 6 depositing the cane cut from row 6 to the left upon the standing cane of row 5. When the cane of row 6 has been completely cut the harvester then traverses the entire group and commences cutting row 2 depositing the cane being cut from row 2 and the previously cut cane from row 1 to the left inwardly upon standing row 3. Upon completion of the cutting of row 2 the harvester then traverses the group of rows commencing cutting row 5 while transferring the cane cut from row 5 plus the cane previously cut from row 6 inwardly to the center of the row groupings. Upon completion of the cutting of row 5 the harvester then traverses the group and comes down row 3 cutting the cane standing in row 3 while simultaneously transferring the previously cut cane from rows 1 and 2 inwardly of the group upon a single common windrow containing the 6 rows of cut cane.

Figure 6:
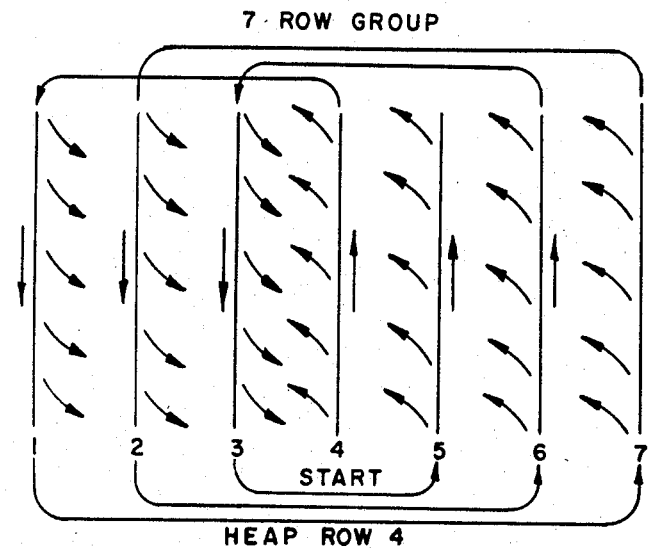
FIGURE 6 is a schematic top plan view of the method of harvesting cane in accordance withe the present invention in 7 row groups.

When it is desired to cut cane in accordance with the present invention in 7 row groups as best seen in FIGURE 6, the following procedure is employed. The harvester enters row 4 cutting row 4 and depositing the cut cane from row 4 upon standing row 3. Upon completion of cutting the harvester then traverses the row group and commences cutting row 1 depositing this cane to the left upon standing row 2. When row 1 has been cut the harvester then traverses the 7 row group and commences cutting row 7 depositing the cane cup upon standing row 6. When row 7 has been cut the harvester then traverses the other end of the 7 row group and commences cutting row 2 while simultaneously transferring inwardly of the group the cane being cut on row 2 plus previously cut cane from row 1. When row 2 has been cut the harvester then traverses the 7 row group and commences cutting row 6 transferring the cane being cut from row 6 as well as the cane previously cut from row 7 inwardly of the group onto the standing cane of row 5. Upon completion of the cutting of row 6 the harvester traverses the far end of the group and commences cutting row 3 while transferring the cane cut from row 3 as well as the cane previously cut from rows 1 and 2 inwardly of the group onto a single windrow. When row 3 has been cut the harvester then enters and cuts row 5 depositing the cane being cut from row 5 to the left upon the single large windrow while simultaneously transferring onto the windrow the previously cut cane of rows 6 and 7 to define one large single windrow of the 7 rows of cut cane.

Figure 8:
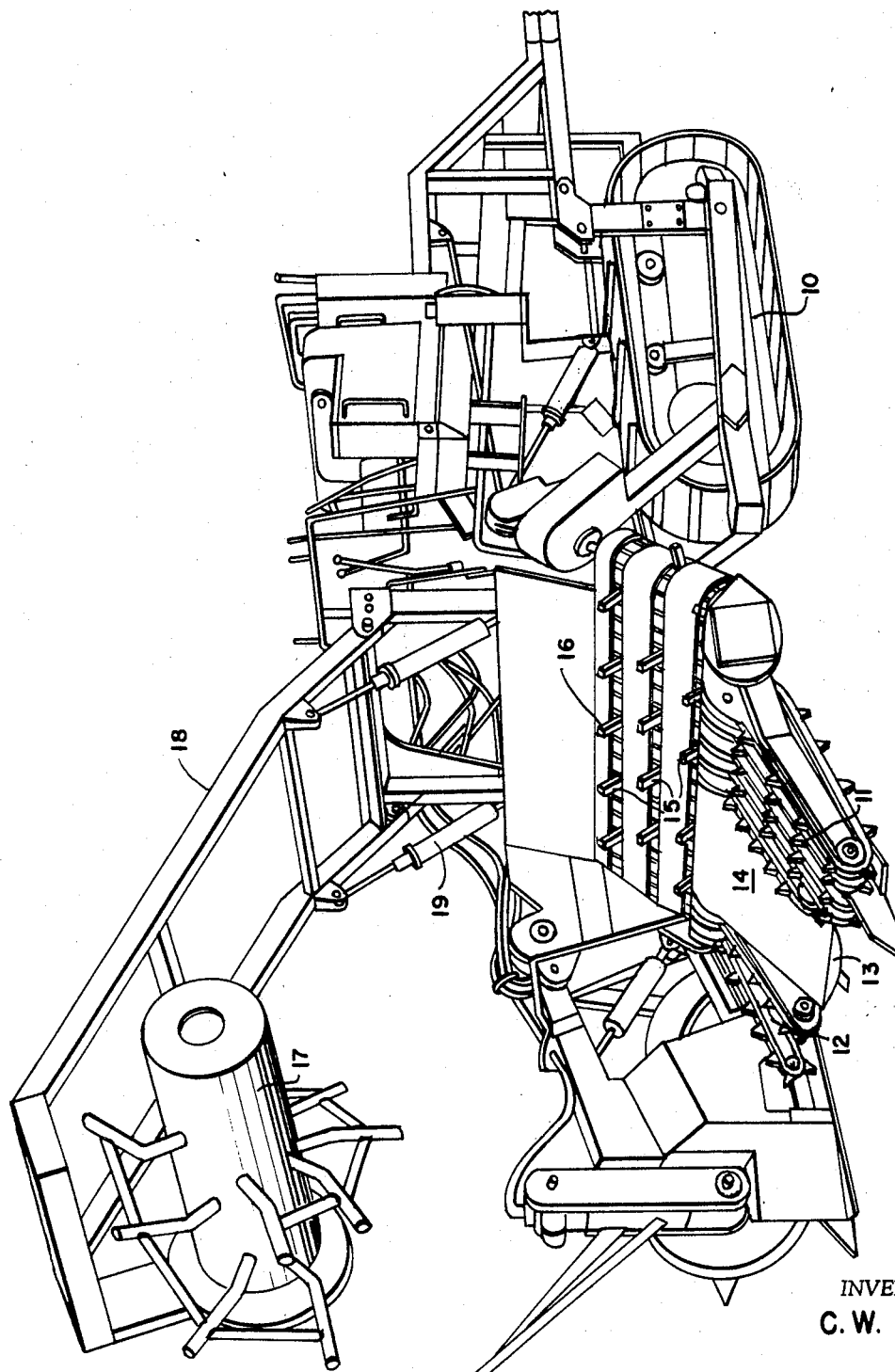
FIGURE 8 is a front perspective view of the harvester employed in practicing the harvesting method of the present invention showing the constant discharge of cut cane to the left hand side of the harvester.

By way of example and not of limitation, referring to FIGURE 8 one form of harvester which may be employed with the present invention consists of a crawler type tractor indicated generally at 10 having a harvester attachment mounted thereon at the front end thereof which consists of gathering members 11, 12, an earth cane cutting knife 13, an inclined base plate 14, and a transverse conveyor 15 having three transverse runs of chains with cane transfer projections 16 secured thereto. Cooperating with the earth cutting and gathereing and lateral transfer conveyor 15 is a scroll 17 which likewise permits transfer movement of the sugar cane cut by the earth cutting member 13 to move the cane cut plus previously cut and stacked cane to the left of the harvester. The scroll 17 is mounted upon a boom arrangement 18 which may be hydraulically raised and lowered at 19 to accommodate varying heights of cane.

One of the key points of departure of the present invention over the prior art and particularly U.S. Patent No. 2,799,984 which relates to the harvesting of sugar cane particularly in the Louisiana fields, is the fact that Louisiana cane is planted in 20 row groups with drainage ditches at each side of the row groupings and in order to prevent slippage of the harvester into the drainage ditch the second row is cut and leaned against the first row and then the first row is cut and the leaning row plus the first row is transferred upon a transverse heap row between the high crests of the undulations in the Louisiana cane field.

The above identified patent does not provide the sequential cutting from the outer limit of a row group and progressively shifting the cut cane transversely of the row group inwardly to define a single central windrow.

One of the principal advantages to be derived from the method of the present invention is the combination of the cane cut from a large number of rows into a single windrow so that the loading equipment need traverse the sugar cane field only once per unit number of rows rather than two or three times for a given number of rows.

Although the invention disclosed herein is the best known method of cutting sugar cane known to me at this time, I reserve the right to all such modifications and changes as may come within the scope of the following claims.

What is claimed is:

1. The method of harvesting a cane crop from a cane field in which the cane grows in substantially parallel rows with the end in view of concentrating the cut canes in a single windrow, comprising
   (a) making an entry into the field at a selected row,
   (b) promptly thereafter moving to outermost rows at opposite ends of the field,
   (c) cutting the cane from such outermost rows, and
   (d) progressing from the outermost rows in relatively opposite directions to the approximate center of the field where the cut cane is united in a single central windrow,
   (e) throwing the cut cane from outermost rows against the next innermost, rows, and
   (f) after cutting the innermost rows moving both the cut and thrown cane inwardly of the field to the central windrow.

2. The herein described method for forming an eight-line windrow comprising
   (a) cutting center rows 4 and 5,
   (b) depositing the cut cane from row 4 onto the growing cane in the inter-row area between adjacent row 3 and the second row away 2,
   (c) depositing the cut cane from row 5 onto the growing cane in the inter-row area between adjacent row 6 and the second row away 7,
   (d) cutting the outside rows 1 and 8,
   (e) depositing the cut cane from row 1 onto the uncut and cut cane in the inter-row area between rows 2 and 3,
   (f) depositing the cut cane from row 8 onto the uncut and cut cane in the inter-row area between rows 6 and 7,
   (g) cutting rows 2 and 7,
   (h) depositing the cane being cut from row 2 and the previously cut cane from row 4 onto the inter-row area between rows 3 and 4,
   (i) depositing the cane being cut from row 7 and the previously cut cane from row 5 onto the inter-row area between rows 5 and 6,
   (j) lastly cutting rows 3 and 6, and a
   (k) as rows 3 and 6 are being cut, the cane from all the rows is moved to the inter-row area between rows 4 and 5 resulting in a single windrow made of all eight rows of cane.

3. The method of claim 2 characterized in that the fourth, eighth, seventh and sixth rows are cut on initial passes and the fifth, first, second and third on return passes.

4. The method of claim 3 characterized in that the passes are made by a mechanical harvester having a lateral discharge for the cut cane and a laterally movable conveyor for receiving the cut cane having capacity to deposit the cut cane in the inter-row areas recited in claim 3.

5. The method of harvesting sugar cane in multiple row groups in excess of 2 row groupings comprising
   (a) first cutting the center row, depositing the cut cane upon a standing adjacent row toward an outer row of the group,
   (b) thereafter cutting the outer row adjacent the center row and depositing the cut cane upon standing adjacent rows inwardly of the group of rows,
   (c) and thereafter cutting the rows from the outer limits of the group inwardly until all the cut cane has been progressively deposited inwardly of the outer limits of the group to define a single windrow of cut cane for transport to the mills.

6. The method of harvesting sugar cane in multiple row groups to define a single windrow of cut cane for transport to the mill comprising
   (a) first cutting the central row of the group of rows depositing the cut cane upon an adjacent standing row,
   (b) thereafter cutting the outer row of the group away from the row upon which the cut cane has been deposited to deposit said outer row upon the center row which has been cut, and
   (c) finally cutting the only standing outer row of cane upon which the center row was deposited and depositing the outer row and central row cut cane upon the cane of the outer row of (b) to define a single windrow of cut cane for transport to the mill.

7. The method of harvesting sugar cane in eight row groups to define a windrow of the cane cut from the eight rows comprising
   (a) first cutting the intermediate two rows (4 and 5) piling the cut cane on outer rows 3 and 6,
   (b) secondly cutting the outer rows 1 and 8 of the eight row group piling the thus cut cane on the uncut adjacent rows 2 and 7,
   (c) thirdly cutting rows 2 and 7 piling the thus cut cane onto rows 3 and 6, and
   (d) finally cutting rows 3 and 6 and piling all of the cut cane of rows 1 through 8 onto a single windrow between rows 4 and 5 to define a single windrow of cut cane for transport to the mill.

References Cited
UNITED STATES PATENTS

| 1,452,395 | 4/1923 | Smith et al. | 171—1 |
| 2,240,168 | 4/1941 | Adkisson | 56—1 |
| 2,799,984 | 7/1957 | LaRose et al. | 56—1 XR |
| 3,090,183 | 5/1963 | Thomson | 56—1 |

ANTONIO F. GUIDA, Primary Examiner